United States Patent
Hunicken et al.

(10) Patent No.: US 10,311,046 B2
(45) Date of Patent: Jun. 4, 2019

(54) SYSTEM AND METHOD FOR PRUNING A SET OF SYMBOL-BASED SEQUENCES BY RELAXING AN INDEPENDENCE ASSUMPTION OF THE SEQUENCES

(71) Applicant: Conduent Business Services, LLC, Dallas, TX (US)

(72) Inventors: Matias Hunicken, Córdoba (AR); Matthias Gallé, Eybens (FR)

(73) Assignee: Conduent Business Services, LLC, Florham Park, NJ (US)

( * ) Notice: Subject to any disclaimer, the term of this patent is extended or adjusted under 35 U.S.C. 154(b) by 296 days.

(21) Appl. No.: 15/262,383

(22) Filed: Sep. 12, 2016

(65) Prior Publication Data
US 2018/0075084 A1 Mar. 15, 2018

(51) Int. Cl.
G06F 16/23 (2019.01)
G06F 17/18 (2006.01)
G06F 17/27 (2006.01)

(52) U.S. Cl.
CPC .......... *G06F 16/2379* (2019.01); *G06F 17/18* (2013.01); *G06F 17/271* (2013.01)

(58) Field of Classification Search
CPC .... G06F 17/30377; G06F 17/20; G06F 17/18; G06F 16/2379; G06F 17/271
USPC .......................................... 707/609
See application file for complete search history.

(56) References Cited

U.S. PATENT DOCUMENTS

| | | | | | |
|---|---|---|---|---|---|
| 5,864,839 | A * | 1/1999 | Bourgoin | .......... | G06F 17/30625 |
| 6,484,168 | B1 * | 11/2002 | Pennock | ............. | G06F 17/3061 |
| 7,275,029 | B1 * | 9/2007 | Gao | .................... | G06F 17/2735 704/1 |
| 7,774,197 | B1 * | 8/2010 | Bulyko | ............... | G06F 17/2715 704/255 |
| 7,877,258 | B1 * | 1/2011 | Chelba | ................ | G06F 17/2715 704/240 |

(Continued)

OTHER PUBLICATIONS

Chen et al., "Pruning Exponential Language Models", In Proceedings of 2011 IEEE Workshop on Automatic Speech Recognition & Understanding (ASRU 2011), Dec. 11-15, 2011, pp. 237-242. (Year: 2011).*

(Continued)

*Primary Examiner* — Phuong Thao Cao
(74) *Attorney, Agent, or Firm* — Fay Sharpe LLP

(57) ABSTRACT

A pruning method includes representing a set of sequences in a data structure. Each sequence s includes a first symbol w and a context c of at least one symbol. Some of the sequences are associated with a conditional probability $p(w|c)$, based on observations of cw in training data. For others, $p(w|c)$ is computed as a function of the probability $p(w|\hat{c})$ of the respective symbol w in a back-off context $\hat{c}$, $p(w|\hat{c})$ being based on observations of sequence $\hat{c}w$ in the training data. A scoring function $f(cw)$ value is computed for each sequence in the set, based on $p(w|c)$ for the sequence and a probability distribution $p(s)$ of each symbol in the sequence if it is removed from the set of sequences. Iteratively, one of the represented sequences is selected to be removed, based on the computed scoring function values, and the scoring function values of remaining sequences are updated.

21 Claims, 12 Drawing Sheets

(56) References Cited

U.S. PATENT DOCUMENTS

| | | | | |
|---|---|---|---|---|
| 8,725,509 | B1* | 5/2014 | Harb | G06F 17/277 704/10 |
| 8,762,417 | B2* | 6/2014 | Vernier | G06Q 10/06 707/798 |
| 9,069,755 | B2* | 6/2015 | Moore | G06F 17/2715 |
| 9,292,487 | B1* | 3/2016 | Weber | G06F 17/27 |
| 9,400,783 | B2* | 7/2016 | Dymetman | G06F 17/27 |
| 9,886,432 | B2* | 2/2018 | Bellegarda | G06F 17/276 |
| 9,941,900 | B1* | 4/2018 | Horn | H03M 7/6076 |
| 10,186,257 | B1* | 1/2019 | Corfield | G10L 15/18 |
| 2001/0053974 | A1* | 12/2001 | Lucke | G10L 15/187 704/240 |
| 2004/0068332 | A1* | 4/2004 | Ben-Gal | G06K 9/6282 700/51 |
| 2004/0091883 | A1* | 5/2004 | Kimura | C07K 1/00 435/6.14 |
| 2005/0171962 | A1* | 8/2005 | Martin | H03M 7/30 |
| 2005/0216265 | A1* | 9/2005 | Chelba | G06F 17/277 704/240 |
| 2006/0053015 | A1* | 3/2006 | Lai | G10L 15/06 704/257 |
| 2006/0100874 | A1* | 5/2006 | Oblinger | G10L 15/144 704/256.3 |
| 2006/0218140 | A1* | 9/2006 | Whitney | G06F 17/3069 |
| 2007/0078653 | A1* | 4/2007 | Olsen | G10L 15/197 704/240 |
| 2007/0239745 | A1 | 10/2007 | Guerraz et al. | |
| 2009/0099841 | A1* | 4/2009 | Chen | G06K 9/72 704/9 |
| 2010/0268527 | A1 | 10/2010 | Tomeh et al. | |
| 2010/0280403 | A1* | 11/2010 | Erdogmus | A61B 5/0484 600/545 |
| 2011/0040711 | A1 | 2/2011 | Perronnin et al. | |
| 2011/0103682 | A1 | 5/2011 | Chidlovskii et al. | |
| 2011/0224971 | A1* | 9/2011 | Moore | G06F 17/271 704/9 |
| 2012/0116766 | A1* | 5/2012 | Wasserblat | G10L 15/08 704/254 |
| 2012/0196261 | A1* | 8/2012 | Kim | G09B 5/062 434/322 |
| 2012/0223889 | A1* | 9/2012 | Medlock | G06F 3/04883 345/168 |
| 2013/0253912 | A1* | 9/2013 | Medlock | G06F 3/0237 704/9 |
| 2014/0022211 | A1* | 1/2014 | Karpin | G06F 3/044 345/174 |
| 2014/0229160 | A1 | 8/2014 | Gallé et al. | |
| 2014/0244248 | A1* | 8/2014 | Arisoy | G10L 15/18 704/232 |
| 2014/0297267 | A1* | 10/2014 | Spencer | G06F 17/276 704/9 |
| 2014/0350917 | A1 | 11/2014 | Gallé et al. | |
| 2014/0351741 | A1* | 11/2014 | Medlock | G06F 17/276 715/773 |
| 2014/0372120 | A1* | 12/2014 | Harsham | G10L 15/22 704/251 |
| 2014/0372122 | A1* | 12/2014 | Harsham | G10L 15/22 704/257 |
| 2015/0100304 | A1 | 4/2015 | Tealdi et al. | |
| 2015/0149151 | A1* | 5/2015 | Dymetman | G06F 17/28 704/9 |
| 2015/0169537 | A1* | 6/2015 | Corston | G06F 17/2715 704/9 |
| 2015/0271047 | A1* | 9/2015 | McLean | H04L 43/50 709/224 |
| 2015/0370781 | A1 | 12/2015 | Gallé et al. | |
| 2015/0371633 | A1* | 12/2015 | Chelba | G10L 15/063 704/240 |
| 2016/0232455 | A1* | 8/2016 | Carus | G06F 17/2715 |
| 2016/0321239 | A1* | 11/2016 | Iso-Sipila | G06F 17/2755 |
| 2017/0300462 | A1* | 10/2017 | Cudworth | G06F 3/0482 |
| 2018/0011839 | A1* | 1/2018 | Galle | G06F 17/2818 |
| 2018/0075084 | A1* | 3/2018 | Hunicken | G06F 17/30377 |

OTHER PUBLICATIONS

Gabadinho et al., "Analyzing State Sequences with Probabilistic Suffix Trees: The PST R Package", Journal of Statistical Software, Aug. 2016, vol. 72, Issue 3, pp. 1-39. (Year: 2016).*

Gao et al., "Distribution-Based Pruning of Backoff Language Models", In Proceedings of the 38th Annual Meeting on Association for Computational Linguistics (ACL '00), Hong Kong, Oct. 3-6, 2000, pp. 579-585. (Year: 2000).*

Hsu et al., "Iterative Language Model Estimation: Efficient Data Structure & Algorithms", In Proceedings of Interspeech, 2008, 4 pages. (Year: 2008).*

Kuhn et al., "DP-Based WordGraph Pruning", In Proceedings of 1996 IEEE International Conference on Acoustics, Speech, and Signal Processing, May 9, 1996, pp. 861-864. (Year: 1996).*

Roark et al., "Smoothed Marginal Distribution Constraints for Language Modeling", In Proceedings of the 51st Annual Meeting of the Association of Computational Linguistics, pp. 43-52, Sofia, Bulgaria, Aug. 4-9, 2013. (Year: 2013).*

Sethy et al., "An Iterative Relative Entropy Minimization-Based Data Selection Approach for n-Gram Model Adaptation", IEEE Transactions on Audio, Speech, and Language Processing, vol. 17, No. 1, Jan. 2009, pp. 13-23. (Year: 2009).*

Seymore et al., "Scalable Backoff Language Models", In Proceedings of Fourth International Conference on Spoken Language Processing (ICSLP '96), pp. 232-235, 1996. (Year: 1996).*

Siivola et al., "On Growing and Pruning Kneser-Ney Smoothed N-Gram Models", IEEE Transactions on Audio, Speech, and Language Processing, vol. 15, No. 5, Jul. 2007, pp. 1617-1624. (Year: 2007).*

Bengio, et al., "A neural probabilistic language model," Journal of Machine Learning Research, vol. 3, pp. 1137-1155 (2003).

Chelba, et al., "Study on interaction between entropy pruning and kneser-ney smoothing," Interspeech, pp. 2422-2425 (2010).

Chen, et al., "An empirical study of smoothing techniques for language modeling," Proc. 34th annual meeting on Association for Computational Linguistics, pp. 310-318 (1996).

Federico, et al., "IRSTLM: an open source toolkit for handling large scale language models," Interspeech, pp. 1618-1621 (2008).

Gao, et al., "Improving language model size reduction using better pruning criteria," Proc. 40th Annual Meeting on Association for Computational Linguistics, pp. 176-182 (2002).

Germann, et al., "Tightly packed tries: How to fit large models into memory, and make them load fast, too," Proc. Workshop on Software Engineering, Testing, and Quality Assurance for Natural Language Processing, pp. 31-39 (2009).

Gutherie, et al., "Storing the Web in Memory: Space Efficient Language Models with Constant Time Retrieval," Proceedings of the 2010 Conference on Empirical Methods in Natural Language Processing, pp. 262-272 (2010).

Karpathy, et al., "Visualizing and understanding recurrent networks," arXiv preprint arXiv:1506.02078, pp. 1-12 (2015).

Katz, "Estimation of probabilities from sparse data for the language model component of a speech recognizer," IEEE Trans. on Acoustics, Speech, and Signal Processing (ASSP-35), pp. 400-401 (1987).

Kneser, et al., "Improved backing-off for m-gram language modeling," Int'l Conf. on Acoustics, Speech, and Signal Processing (*ICASSP*-95), pp. 181-184 (1995).

Manning, et al., "Foundations of statistical natural language processing," vol. 999, pp. MIT Press, pp. 192-227 (1999).

Mikolov, et al., "Subword language modeling with neural networks," downloaded at: http://www.fit.vutbr.cz/imikolov/rnnlm/char.pdf, pp. 1-4 (2012).

Nguyen, et al., "MSRLM: a scalable language modeling toolkit," Microsoft Research MSR-TR-2007-144, pp. 1-18 (2007).

Pauls, et al., "Faster and smaller n-gram language models," Proceedings of the 49th Annual Meeting of the Association for Computational Linguistics: Human Language Technologies, vol. 1, pp. 258-267 (2011).

Seymore, et al., "Scalable backoff language models," Proc. 4th Int'l Conf. on Spoken Language (ICSLP), vol. 1, pp. 232-235 (1996).

(56) References Cited

OTHER PUBLICATIONS

Stolcke, et al., "Entropy-based pruning of backoff language models," arXiv preprint cs/0006025, pp. 1-5 (2000).
Watanabe, et al., "A succinct n-gram language model," Proc. ACL-IJCNLP 2009 Conf. Short Papers, pp. 341-344 (2009).

* cited by examiner

SYSTEM AND METHOD FOR PRUNING A SET OF SYMBOL-BASED SEQUENCES BY RELAXING AN INDEPENDENCE ASSUMPTION OF THE SEQUENCES

BACKGROUND

The following relates to processing sequences and finds particular application in systems and methods for pruning a set of sequences, such as a set of n-grams and associated statistics for a language model.

Language modeling is widely used in Natural Language Processing (NLP) for scoring a sentence with respect to a language or domain. Both character-based and word based language models have been used. Character-based language models can avoid the problem of out-of-vocabulary words that is faced when using word-based language models, and is also language independent, avoiding the need for language-specific stemmer and tokenizers. While such models may be based on recurrent neural networks (RNN), n-gram models are often used, due to their simplicity, few hyper-parameters to be tuned, and speed. One problem with n-gram models is that the size of the language model can be unwieldy. This is particularly problematic when deploying language models on computers with less powerful hardware, such as smartphones. Thus, attempts are often made to reduce the size of the model by pruning some of the n-grams and their associated corpus statistics from the model (lossy) or by finding more efficient data-structures in which to store them (lossless).

Existing pruning methods often prune n-grams that are considered uninformative or rarely used, for example, by removing n-grams that occur less than a predetermined number of times in the training data. More sophisticated methods assign a score to each n-gram, depending on the expected decrease in performance that the model will have when it is removed. Scoring functions used in such methods include probability pruning (Gao, Jianfeng, et al., "Improving language model size reduction using better pruning criteria," *Proc. 40th Annual Meeting on Association for Computational Linguistics*, pp 176-182, 2002, hereinafter "Gao," and entropy pruning (Stolcke "Entropy-based pruning of backoff language models," *arXiv preprint* cs/0006025, 2000, hereinafter "Stolcke 2000"). In these methods, the score for each n-gram is assigned independently. The score for removing one n-gram does not take into account that another n-gram may also be removed. This makes for a sub-optimal choice, as a set of n-grams may have little impact independently, but their collective removal can degrade the model.

There remains a need for a system and method that provides an improvement in language model pruning.

INCORPORATION BY REFERENCE

The following references, the disclosures of which are incorporated herein in their entireties by reference, are mentioned:

U.S. Pub. No. 20100268527, published on Oct. 21, 2010, entitled BI-PHRASE FILTERING FOR STATISTICAL MACHINE TRANSLATION, by Nadi Tomeh, et al., describes a system and method for pruning a library of bi-phases for use in a machine translation system.

U.S. Pub. No. 20140229160, published on Aug. 14, 2014, entitled BAG-OF-REPEATS REPRESENTATION OF DOCUMENTS, by Matthias Gallé, describes a system and method for representing a document based on repeat subsequences.

U.S. Pub. No. 20140350917, published Nov. 27, 2014, entitled IDENTIFYING REPEAT SUBSEQUENCES BY LEFT AND RIGHT CONTEXTS, by Matthias Gallé describes a method of identifying repeat subsequences of symbols that are left and right context diverse.

U.S. Pub. No. 20150100304, published Apr. 9, 2015, entitled INCREMENTAL COMPUTATION OF REPEATS, by Matías Tealdi, et al., describes a method for computing certain classes of repeats using a suffix tree.

U.S. Pub. No. 20150370781, published Dec. 24, 2015, entitled EXTENDED-CONTEXT-DIVERSE REPEATS, by Matthias Gallé, describes a method for identifying repeat subsequences based a diversity of on their extended contexts.

The following relate to training a classifier and classification: U.S. Pub. No. 20110040711, entitled TRAINING A CLASSIFIER BY DIMENSION-WISE EMBEDDING OF TRAINING DATA, by Perronnin, et al.; and U.S. Pub. No. 20110103682, entitled MULTI-MODALITY CLASSIFICATION FOR ONE-CLASS CLASSIFICATION IN SOCIAL NETWORKS, by Chidlovskii, et al.

The following relates to a bag-of-words format: U.S. Pub. No. 20070239745, entitled HIERARCHICAL CLUSTERING WITH REAL-TIME UPDATING, by Guerraz, et al.

BRIEF DESCRIPTION

In accordance with one aspect of the exemplary embodiment, a sequence pruning method includes representing a set of sequences in a data structure. Each sequence includes a first symbol and a context of at least one symbol. A subset of the sequences is associated with a respective conditional probability that is based on observations of the sequence in training data. A value of a scoring function is computed for each sequence in the set of represented sequences. The scoring function takes into account the conditional probability for the sequence and a probability distribution of each symbol in the sequence if the respective sequence is removed from the set of sequences. The conditional probability for each sequence in the set that are not in the subset of sequences is computed as a function of the respective symbol in a back-off context. The set of sequences is iteratively pruned by selecting one of the represented sequences to be removed, the selection being based on the computed scoring function values. The scoring function value of at least one of the remaining sequences is updated. A set of remaining sequences is output.

At least one of the representing, computing, pruning, and updating may be performed with a processor.

In accordance with another aspect, a sequence pruning system includes memory which stores a data structure representing a set of sequences, each sequence including a first symbol and a context of at least one symbol, a subset of the sequences being associated with a respective conditional probability that is based on observations of the sequence in training data. A scoring function computation component computes a value of a scoring function for each sequence in the set of represented sequences, the scoring function taking into account the conditional probability for the sequence and a probability distribution of each symbol in the sequence if the respective sequence is removed from the set of sequences, the conditional probability for each sequence in the set that is not in the subset of sequences being computed as a function of the respective symbol in a back-off context.

A sequence selecting component selects a next one of the represented sequences to be removed, the selection being based on the computed scoring function values. An update component which updates the scoring function values of remaining ones of the sequences prior to the sequence selecting component selecting another next one of the represented sequences to be removed. An output component outputs a set of remaining sequences. A processor implements the components.

In accordance with another aspect, a pruning method includes receiving a set of sequences, each received sequence including at least one symbol and a context. For at least some of the received sequences, the context comprises at least one respective preceding symbol. Each of the received sequences in the set being associated with a respective conditional probability that is based on observations of the sequence in a corpus. Each of the received sequences is represented as a respective node in a tree structure in which each of the nodes is directly linked to no more than one node representing a direct ancestor (parent) and wherein at least some of the nodes in the tree structure represent back-off sequences in which the context of a linked node in the tree is reduced by at least one symbol. A value of a scoring function is computed for at least some of the sequences in the tree structure based on respective conditional probabilities. The conditional probability for sequences represented in the tree structure that are not in the set of received sequences being computed as a function of the respective symbol in its back-off context. One of the represented sequences is selected for removal, based on the computed scoring function values. The sequence to be removed is selected from represented sequences for which there are no remaining sequences represented in the tree structure that consist of at least one symbol in addition to the same sequence as the selected sequence, the same sequence preceding the additional at least one symbol. A value of a scoring function is updated for at least one remaining one of the sequences, whose scoring function value is changed by the removal of the selecting one of the represented sequences. After the updating, the selecting of one of the represented sequences from the remaining set of represented sequences is repeated. A set of the remaining sequences is output.

At least one of the representing, computing, selecting, and updating may be performed with a processor.

DETAILED DESCRIPTION

Figure 1:
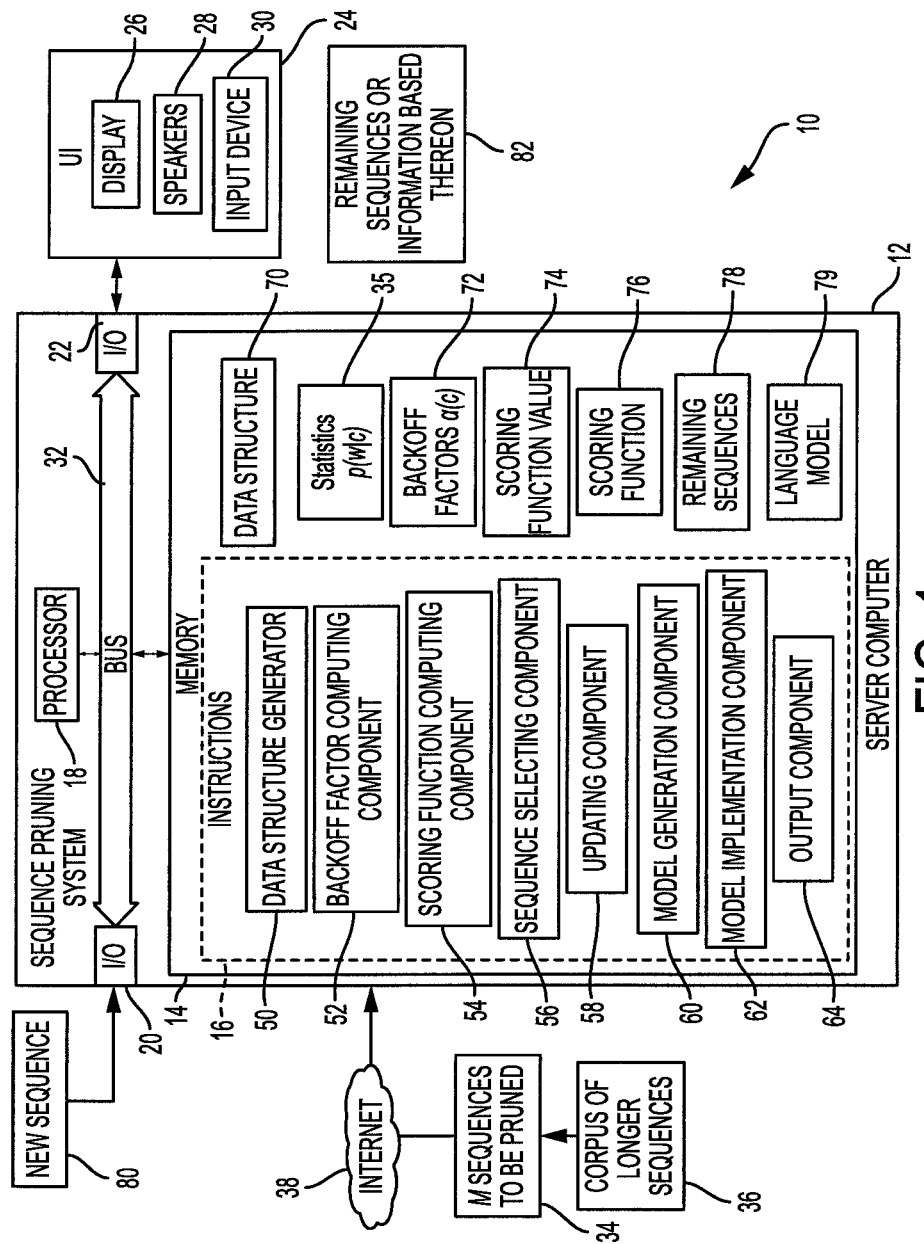
FIG. 1 is a functional block diagram of a pruning system in accordance with one aspect of the exemplary embodiment.

The exemplary embodiment relates to a system and method for pruning a set of sequences of symbols by removing sequences based on scoring function values (scores) for the sequences. The scores for the remaining sequences in the set of sequences of symbols are progressively updated during the pruning. Sequences of symbols may be referred to herein as n-grams, where n is the number of symbols in the respective sequence.

The following discloses an efficient way of pruning language models to keep only the most informative n-grams. In one embodiment, rather than re-computing all scores after removing an n-gram, an algorithm is used that updates only the scores of those n-grams whose score changes. In one embodiment, a partial ordering is used on the n-grams, which arises naturally from a tree-based data structure. This limits which n-grams can be pruned at a given moment. The disclosed method can be implemented with existing pruning techniques. Experiments described herein show consistent improvement across corpora, pruning strategy, order n and smoothing technique.

As used herein a sequence s of symbols includes one or more symbols drawn from a vocabulary $\Sigma$. The symbols may be for example, words, single characters, such as ASCCII or Kanji characters, symbols representing units of biological sequences, or the like. Each sequence s is considered to include a first symbol w and a context c adjacent to the first symbol. Except in the case of unigrams (where the context is empty), the context c includes one or more symbols. In general, the context c immediately precedes the first symbol w, i.e., the first symbol w is the last symbol of the sequence, such that s consists of cw. However, in other embodiments, both past (preceding) and future symbols may be considered as context.

A back-off context is denoted ĉ. A back-off context corresponds to a context c that is missing its terminal (e.g., first) symbol. A sequence ĉw created from the n-gram cw thus has different statistics in a corpus than cw, i.e., is more likely to have been observed in the corpus.

Smoothing techniques can be adapted the definition of context used herein. An evaluation of the method shows significant and consistent improvement in applications such as symbol prediction (predicting the next symbol in a sequence, given the preceding ones). The method finds application in a variety of fields, such as language identification and in ranking (or scoring) of machine translations (e.g., statistical machine translations), text sequences generation from spoken utterances, or text sequences generated from a canonical or logical form in natural language generation. The pruned sequences, and their associated statistics, can be used, for example, in the generation of a language model for use in natural language processing, machine translation, and the like.

Back-off models for pruning generally rely on evaluating a score function over n-gram sequences, and removing the sequences that achieve the lowest scores. The disclosed systems and methods select the n-grams to prune by updating the scores generated by the scoring functions.

With reference to FIG. 1, a functional block diagram of a sequence pruning system 10 is shown. The sequence pruning system 10 is implemented by a computer 12 (e.g., a server computer) or other electronic data processing device that is programmed to perform the disclosed sequence pruning operations. It will be appreciated that the disclosed sequence pruning approaches may additionally or alternatively be embodied by a non-transitory storage medium storing instructions readable and executable by the computer 12 or other electronic data processing device to perform the disclosed sequence pruning.

As shown in FIG. 1, the illustrated computer system 10 includes memory 14 which stores software instructions 16 for performing the exemplary method, and a processor 18, in communication with the memory 14, which implements the instructions. In particular, the processor 18 executes instructions for performing the pruning methods outlined in FIG. 2. The processor 18 may also control the overall operation of the computer 12 by execution of processing instructions which are stored in memory 14. The computer 12 may also include one or more of a network interface 20 and a user input/output interface 22. The I/O interface 22 may communicate with a user interface (UI) 24 which may include one or more of a display device 26, for displaying information to users, speakers 28, and a user input device 30 for inputting text and for communicating user input information and command selections to the processor, which may include one or more of a keyboard, keypad, touch screen, writable screen, and a cursor control device, such as mouse, trackball, or the like. The various hardware components 14, 18, 20, 22 of the computer 12 may be all connected by a bus 32. The system may be hosted by one or more computing devices, such as the illustrated server computer 12.

The system has access to a collection 34 of sequences s to be pruned. Each of the input sequences may be associated with one or more statistics 35 generated from a corpus 36 of sentences or other (generally longer) sequences from which the sequences s are extracted. The statistic 35 for sequence s may be the conditional probability p(w|c) of observing the symbol w in context c in the corpus 36, i.e., the probability of observing the sequence cw in the corpus. The collection 34 may be stored in memory 14 or accessed from a remote memory device via a wired or wireless link 38, such as a local area network or a wide area network, such as the internet. Each sequence in the collection 34 includes a set of symbols, such as words, characters, or biological symbols drawn from a vocabulary of symbols. For example in the case of words, the sequences in the corpus 36 may be human-generated sentences in a natural language, such as English or French.

The computer 12 may include one or more of a PC, such as a desktop, a laptop, palmtop computer, portable digital assistant (PDA), server computer, smartphone, tablet computer, pager, combination thereof, or other computing device capable of executing instructions for performing the exemplary method.

The memory 14 may represent any type of non-transitory computer readable medium such as random access memory (RAM), read only memory (ROM), magnetic disk or tape, optical disk, flash memory, or holographic memory. In one embodiment, the memory 14 comprises a combination of random access memory and read only memory. In some embodiments, the processor 18 and memory 14 may be combined in a single chip. The network interface 20 allows the computer to communicate with other devices via a computer network, such as a local area network (LAN) or wide area network (WAN), or the Internet, and may comprise a modulator/demodulator (MODEM) a router, a cable, and and/or Ethernet port. Memory 14 stores instructions for performing the exemplary method as well as the processed data.

The digital processor 18 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The sequence pruning system 10 includes a data structure generator 50, back-off factor computing component 52, a scoring function computing component 54, a sequence selecting component 56, an updating component 58, a model generation component 60, a model implementation component 62, and an output component 64. Some of these components are optional and/or may be hosted by separate computing systems.

The data structure generator 50 receives as input the collection 34 of sequences to be pruned and represents them in a data structure 60. The data structure represents both the sequences s in the collection that have associated statistics 35 (which are generally only a subset of the represented sequences) as well as sequences representing back-off contexts which do not have associated statistics generated from the corpus 36. Each of the sequences represented in the data structure includes a first symbol w and a context c of the first symbol w. In some examples, the symbols in each sequence include one or more words. In some examples, the context of each symbol includes a set of at least one preceding symbol relative to the first symbol. The data structure 70 is described in more detail with respect to FIG. 3.

The back-off factor computing component 52 computes a back-off factor 72, denoted $\alpha(c)$, which enables statistics p(w|c) 35 to be computed for sequences represented in the data structure 70 that do not have an associated statistic generated from the corpus 36 and optionally for smoothing statistics of the input sequences.

The scoring function computing component 54 computes a value 74 of a scoring function 76, denoted $f(cw)$, for each sequence s in the set of sequences 34. For example, the scoring function computed by the component 54 takes the conditional probabilities into account. In particular, the scoring function takes into account a difference between p(w|c) (or a function thereof) before and after pruning, if pruning were to be performed, thereby removing that sequence from the set of sequences.

For those of the sequences that are not in the subset 34 of sequences having an associated statistic, a conditional probability p(w|c) is computed by the computing component 54 as a function of the respective symbol in a back-off context ĉ computed by the back-off factor computing component 52. These conditional probabilities may be computed and stored in memory, or may be computed when needed by the scoring function computing component 54 which normalizes the conditional probabilities of the non-stored sequences with the back off factor.

In further embodiments, the scoring function computing component 54 applies a smoothing technique for providing symbol predictions for symbols of the input sequence for which the full context has not been observed (or is below a threshold) in combination with that symbol in a training set.

The sequence selecting component 56 selects a sequence to be pruned from the set 34, based on the computed scoring function values. The lower the value, the lower the impact of removing the sequence is expected to be. However, certain constraints (restrictions) may be applied which limit the selection to those sequences which do not correspond to a word in a back-off context where there is a remaining sequence representing that word in the data structure. Specifically, a current sequence s is removed by the sequence selecting component 56 only if all other sequences ws (i.e., sequences that include the first symbol w) have been removed. In some embodiments, the sequence selecting component 56 arranges the sequences to be pruned in a queue, ordered by scoring function values and selects one of the represented sequences s for removal from the subset 34 of sequences. For example, the sequence selecting component 56 selects one or more of the sequences (along with the corresponding statistic) from the set 34 to be pruned. Then the sequence selecting component 56 removes the current represented sequence s from the subset of sequences.

Once a sequence s is removed from the subset of sequences, the sequence updating component 58 calls on the scoring function computing component 54, which updates the scoring function values (i.e., the probabilities) of the remaining sequences in the subset of sequences.

The removing and updating is performed for a number of iterations, such as 10, 20, 50 or more iterations, depending on the desired number of remaining sequences 78 and/or other stopping point criteria, such as the performance of the remaining sequences, e.g., as a language model 79, or until no n-gram achieves a score higher than a predefined threshold.

The optional model generation component 60 stores the remaining sequences 78 and their statistics as a model, e.g., a language model 79. The language model includes a remaining subset of the received sequences, and may further include other sequences, such as unigrams, as well as their associated conditional probabilities or normalized values thereof. The optional model implementation component 62 implements the model. For example, the model is incorporated into a statistical machine translation system, which uses the statistics of the sequences in the model (or values derived from them) as features of a log-linear translation model, to evaluate a new sequence of symbols 80.

The output component 64 outputs the set of remaining sequences 78 in the subset of sequences (e.g., as a list of remaining sequences or a language model 79), and/or other information 82 based thereon.

Figure 2:
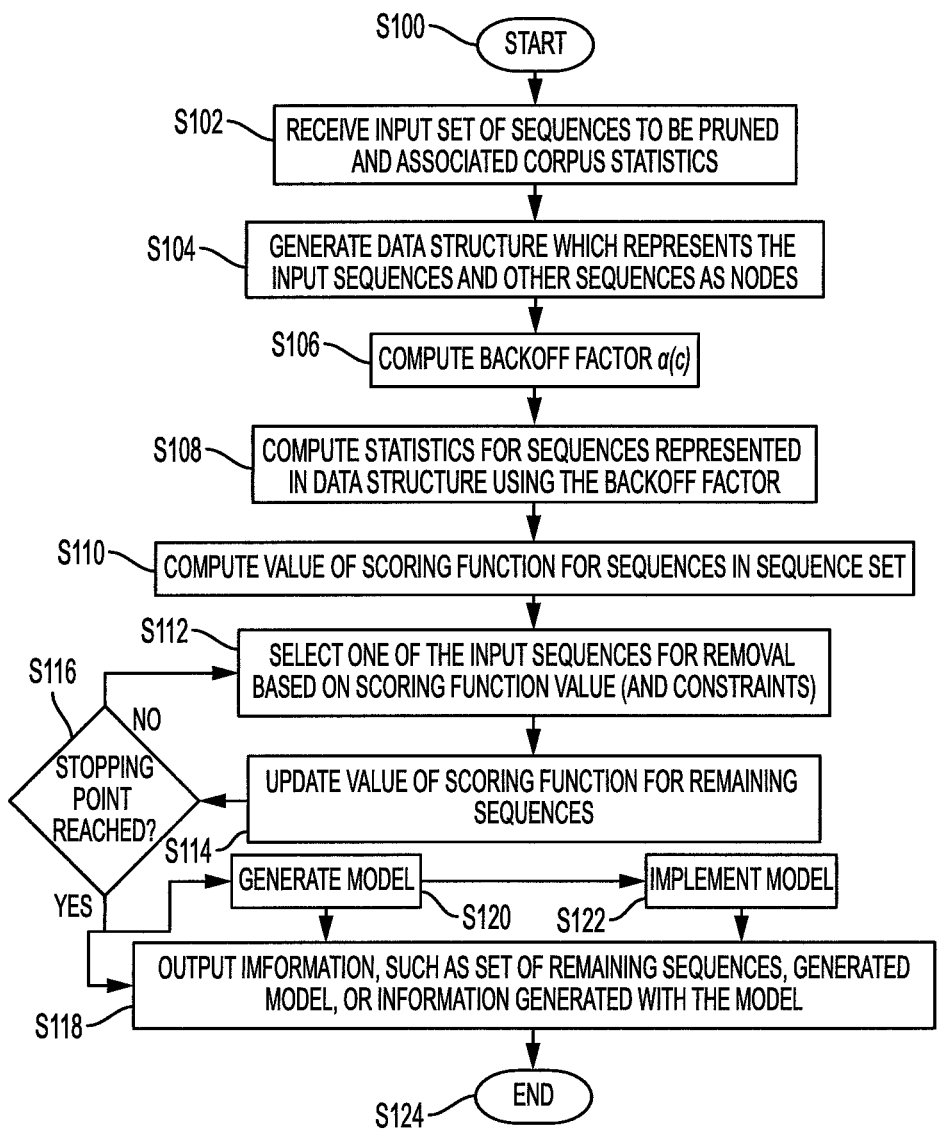
FIG. 2 is a flow chart illustrating a pruning method in accordance with another aspect of the exemplary embodiment.

With reference now to FIG. 2, a sequence updating method which may be implemented with the system of FIG. 1 is illustrated. The method starts at S100.

At S102, a set 34 of input sequences to be pruned is received. The received sequences may be n-grams where n is a predetermined size, and wherein each sequence includes a symbol in a respective context, the context including at least one symbol. A statistic, such as a probability of the symbol in its corresponding context (conditional probability) is received for each sequence in the input set 34. In other embodiments, the corpus 34 may be used to acquire the sequences and their respective statistics.

At S104, a data structure 70, such as a tree, is generated, by the data structure generator 50. The data structure represents the received sequences in the set 34, e.g., as nodes of the tree, as well as other sequences that are not in the received set 34 of sequences. These additional sequences may include unigrams and optionally including longer sequences.

At S106, a back-off factor 72 for a context c is computed for each of a set of contexts of the sequences represented in the data structure. This enables computing statistics for the sequences in the data structure 72 that do not have an associated stored statistic (and optionally for smoothing the existing statistics).

At S108, statistics may be computed for the sequences in the tree that do not have a stored statistic, using the respective back-off factor. A smoothing technique may be applied for providing statistics for sequences for which the full context, in combination with that symbol, has not been observed (or is below a threshold) in the corpus. Optionally, the statistics of the input set of sequences are also smoothed using the back-off factors. In some embodiments, these computed statistics and/or back-off factors may be stored in memory. In other embodiments, they may be computed on-the-fly as needed.

At S110, a value of a scoring function is computed for each of (or at least some of) the sequences in the data structure, by the computing component 54.

At S112, one of the represented sequences s is selected for removal from the set of input sequences, e.g., by the sequence selecting component 56. In particular, one or more of the input sequences (along with the corresponding conditional probability) is selected from the set 34, based on the computed value of the scoring function. The selection may be limited to those sequences which meet one or more restrictions, as outlined below. In particular, the effect of removing the sequence from the set of sequences is considered and a sequence having a smallest effect which meets the restrictions is selected for removal.

At S114, after the selection of one of the sequences for removal, the scoring function value(s) 74 of one or more remaining sequences are updated, e.g., by the sequence updating component 58. In an exemplary embodiment, the sequences whose scoring function values will have changed are identified, and only the new scoring function values for these sequences are recomputed. This may include recomputing one or more back-off factors.

At S116, if a stopping point has not yet been reached, e.g., if there are more than a desired number of input sequences remaining, the method returns to S112 for a further iteration, otherwise proceeds to S118 or S120.

At S118, information, such as a set of remaining sequences 78 in the subset of sequences may be output from the system by the output component 64. Optionally, at S120, a model, such as a language model 79, is generated from at least some of the remaining sequences, by the model generation component 60. At S122 a task may be performed using the model 76, such as statistical machine translation, by the model implementation component.

The method ends at S124.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 12 (for example, an internal hard drive of RAM), or may be separate (for example, an external hard drive operatively connected with the computer 12), or may be separate and accessed via a digital data network such as a local area network (LAN) or the Internet (for example, as a redundant array of inexpensive or independent disks (RAID) or other network server storage that is indirectly accessed by the computer 12, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details on the system and method will now be provided.

The purpose of language modeling (or more generally, sequence modeling) is to estimate probability distributions p(w|c), where c is the context of previously seen symbols, and w is the next symbol in the sequence. The vocabulary (set of symbols predictable by a model) is denoted by $\Sigma$. The exemplary back-off model combines the advantage of higher-order models with the better statistical information of lower-order. It explicitly stores a subset M of n-grams (M={cw:p(w|c), is explicitly stored) keeping for each n-gram cw the conditional probability p(w|c) (which varies according to the chosen smoothing technique). If a probability is not stored, it can be calculated as:

$$p(w|c) = \alpha(c) p(w|\hat{c}),$$

where $\hat{c}$ is the back-off context (c without its first symbol) and the back-off factor $\alpha(c)$ of c is a normalizing factor, that makes the probabilities sum to 1. The back-off factor can be computed as:

$$\alpha(c) = \frac{1 - \sum_{w: cw \in M} p(w|c)}{1 - \sum_{w: cw \in M} p(w|\hat{c})} = \frac{\sum_{w: cw \notin M} p(w|c)}{\sum_{w: cw \notin M} p(w|\hat{c})} \quad (1)$$

Unigram probabilities are generally always stored.

Smoothing Techniques

A suitable smoothing technique can be incorporated into this general framework. The smoothing technique gives non-zero probabilities to sequences not seen in the corpus, and may reduce the probabilities for observed sequences so that all probabilities sum to 1.

Various smoothing functions are contemplated for computing the probability p(w|c). In general, any smoothing technique which is suitable for use in an n-gram model can be used. The exemplary smoothing technique computes a probability p(w|c) for a word in its context as a function of the count of the word in its context $f(o(w|c))$, if this is available ($f(o(w|c)) < o(w|c)$), and of the count of the word in a more general context otherwise.

In one embodiment, a smoothing technique based on that of Chen, et al., "An empirical study of smoothing techniques for language modeling," *Proc. 34th annual meeting on Association for Computational Linguistics*, pp. 310-318, 1996, hereinafter "Chen 1996."), may be used.

In one embodiment, the Absolute Discount back-off may be applied as the smoothing function, as described, for example, in Manning, et al., "Foundations of statistical natural language processing," vol. 999, MIT Press, 1999 (hereinafter, Manning 1999). In this embodiment, part of the probability mass is reserved for unseen symbols. The conditional probability of a symbol in its context is then defined as: p*(w,c)=p(w,c)−β, where β is a discount factor having a value between 0 and 1. The discount factor β can be optimized on a development set.

Katz-back-off is a similar technique that uses a multiplicative discount instead. See, Manning 1999; Katz, "Estimation of probabilities from sparse data for the language model component of a speech recognizer," IEEE Trans. on Acoustics, Speech, and Signal Processing (ASSP-35), pp. 400-401, 1987. Kneser-Ney smoothing can also be used. This method adds another type of count, the number of contexts in which a word occurs. (Kneser, et al., "Improved backing-off for m-gram language modeling," Intl Conf. on Acoustics, Speech, and Signal Processing (*ICASSP*-95), pp. 181-184, 1995.

Other exemplary smoothing techniques which may be used herein are described, for example, in Chen 1996, and Chen, et al., "An Empirical Study of Smoothing Techniques for Language Modeling," Harvard TR-10-98, 1998. These include Jelinek-Mercer smoothing (Jelinek, et al., "Interpolated estimation of Markov source parameters from sparse data," *Proc. Workshop on Pattern Recognition in Practice*, 1980), However, other smoothing techniques may be used which give non-zero probabilities to sequences not seen in the corpus.

Trie Data Structure

Figure 3:
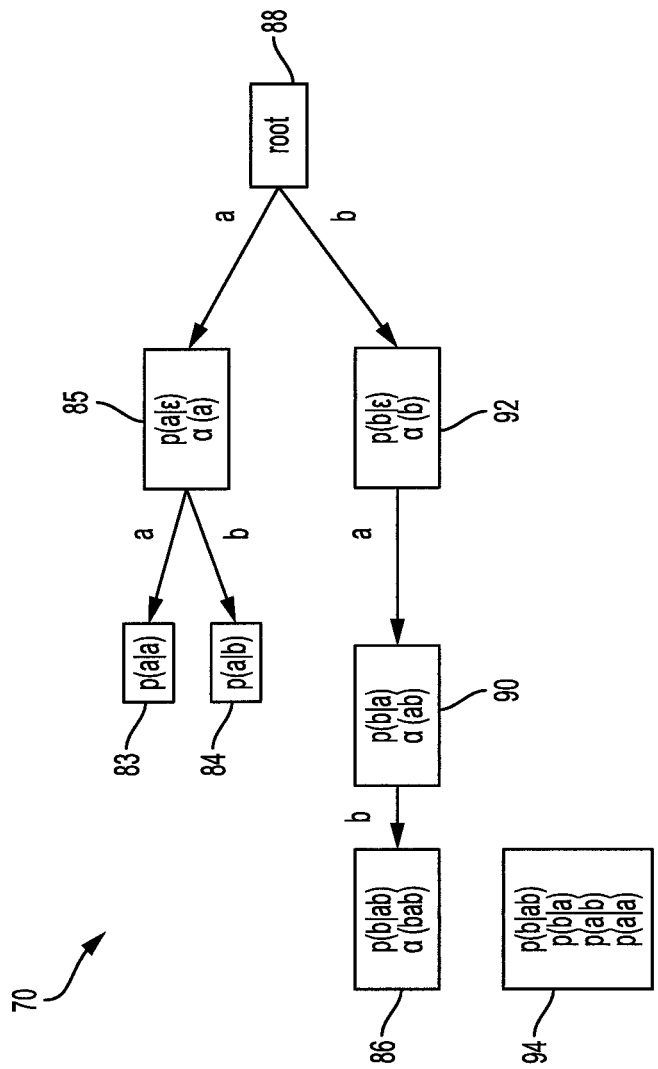
FIG. 3 illustrates a data structure in which sequences of symbols and context for symbols are represented.

An example of the data structure 70 is shown in FIG. 3 for a sequence data set {aa,ba,bab}. As shown in FIG. 3, the data structure 70 is in the form of a trie with a plurality of nodes 84, 86, 90, 92, etc. Each node represents a sequence (n-gram) and is connected to a root node by zero, one or more intermediate nodes, such as nodes. Each of the nodes, except the root, is directly linked to exactly one a direct ancestor node.

As shown in FIG. 3, the n-grams are stored in the trie 70 in a reverse (right to left) order. The nodes store probabilities and back-off factors. In the leaf node 86 corresponding to sequence bab, for example, p(b|ab) and α(bab) are stored. The intermediate nodes include nodes directly connected to the root node, such as node 92, which represents a unigram probability, in this case, the probability of b without any context, denoted by the empty set ε. The next set of nodes, such as node 90 represent n-grams whose context is increased by one symbol, here the probability of b in context a. As will be appreciated, for a large language model, the tree may include hundreds, thousands, or millions of such nodes, and each leaf node 84, 86 is connected to the root node 88 by a path which includes 0, 1 or more intermediate nodes. While a single trie 70 is shown in FIG. 3, separate tries can be used with the same arrangement of nodes, one trie for the conditional probabilities and the other for the back-off factors. From the data structure, a priority queue 94 is generated.

This way of storing n-grams allows for an efficient back-off calculation during selection. The potential contexts to which the model can back-off all have common suffixes. Therefore, only a single lookup is necessary to find the context used for back-off (which is the longest c' such that it is a suffix of c and cw∈M), and another one to calculate the back-off normalization factor α(c), which is the product of back-offs in the path from c' to the longest suffix of c that exists in the model).

The trie reduces the cost of storing all the data for M. The trie can be a forward trie or a backward trie. A forward tree factors out common prefixes so that the n-grams can be read left-to-right (see, for example, Watanabe, et al., "A succinct n-gram language model," *Proc. ACL-IJCNLP* 2009 *Conf. Short Papers,* pp. 341-344, 2009. Using a reverse order (right-to-left), as shown in FIG. 3, however, allows for efficient back-off calculations to be made during prediction (see, Germann, et al., "Tightly packed tries: How to fit large models into memory, and make them load fast, too," Proc. Workshop on Software Engineering, Testing, and Quality Assurance for Natural Language Processing, pp. 31-39, 2009).

Such a data structure 70 imposes some limitations on which n-grams can be pruned, independently of their impact on the model. There are cases in which erasing the n-gram probability corresponding to a node does not allow erasing of the node itself. This happens when either the corresponding back-off factor is needed, or there are descendants in the tree structure which are still in the model. For example, the removal of an intermediate node, such as node 90, with non-pruned descendants 86 in the tree would only marginally reduce the model. Even if the associated values can be erased safely, the node itself will still be stored in order to have access to the descendants.

In the exemplary embodiment, the following restriction is applied:

Restriction 1: a sequence s should only be pruned if all other sequences ws have been pruned.

In a reverse-trie structure, an additional restriction may be applied:

Restriction 2: sequence s should only be pruned if all other sequences sw have been pruned.

Thus, for example, in the case of FIG. 3, intermediate node 90 will not be positioned in the queue higher than node 86, since leaf node 86 should be pruned before node 90. Also, if node 83 is pruned, all its sibling leaf nodes 84 will need to be pruned before node 85 is pruned.

This is reasonable, since a conditional probability cannot be pruned if a probability given a more specific context is still present.

Moreover, the second restriction simplifies the task of updating the pruning score function values, since it restricts the number of n-grams for which the score changes.

Two exemplary pruning methods which can be employed are probability pruning and relative entropy pruning.

Scoring Functions

In the context of scoring functions for pruning, the probability distribution over symbols that are in back-off contexts if the n-gram considered is removed is denoted p', where p'=α'(c)p(w|ĉ), and where the back-off factors after pruning are denoted α'. Both example pruning strategies start from the difference log p(w|c)−log p'(w|c). The smaller this difference, the smaller the impact of removing that specific n-gram. The methods differ in which sequences/contexts are considered, and the weight that the difference receives.

In the following, the probability of a sequence s denoted p(s) is computed as:

$$p(s)=p(s_1|\varepsilon)p(s_2|s_1) \ldots p(s_{|s|}|s_1 \ldots s_{|s|-1})$$

This p(s) is used in Eqns. 2 and 3, below, under the form p(cw) and p($c_i w_j$).

1. Probability Pruning Scoring Function

Probability pruning, as described in Gao, includes only considering the effect on the n-gram to be pruned, and weighting it with its probability. The scoring function is then computed as:

$$f_{prob}(cw) = p(cw)[\log p(w \mid c) - \log p'(w \mid c)] \quad (2)$$
$$= p(cw)[\log p(w \mid c) - \log(\alpha'(c)p(w \mid \hat{c}))]$$

The aim of probability pruning is to give low scores to n-grams that are expected to occur little, and whose conditional probability is not reduced much if they are pruned. As an alternative, the method described in Seymore, et al., "Scalable backoff language models," *Proc. 4th Int'l Conf. on Spoken Language (ICSLP),* vol. 1, pp. 232-235, 1996. hereinafter "Seymore") can be used. This method weights the log-difference by the absolute frequency of cw, instead of its probability.

2. Relative Entropy Pruning Scoring Function

Relative entropy pruning, uses as score function the relative entropy between the original model and the model after pruning the single n-gram being currently considered. The scoring function is then computed as:

$$f_{ent}(cw) = \sum_{c_i, w_j} p(c_i w_j)[\log p(w_j \mid c_i) - \log p'(w_j \mid c_i)] \quad (3)$$

where the summation is over all contexts $c_i$ and symbols $w_j$. See, Stolcke 2000. Eqn. 3 can be simplified, by taking into account that most of the probabilities are not changed by pruning a single n-gram, which allows computing the value in $\mathcal{O}(1)$ for each n-gram. $f_{ent}(cw)$ then becomes:

$$f_{ent}(cw) = -p(c)(p(w|c)(\log(p(w|\hat{c}) + \log \alpha'(c) - \log p(w|c) + \log \alpha'(c) - \log \alpha(c)(\Sigma_{w_i: c_{w_i} \in M} p(w_i|c)) \quad (4)$$

The last summation $\Sigma_{w_i: c_{w_i} \in M} p(w_i|c)$ is over symbols that do back-off, given context c, and is simply the total probability mass given to back-off estimated probabilities, which can be efficiently calculated beforehand.

In the conventional application of these methods, the relevance of an n-gram is not recomputed during the pruning process. This makes for a sub-optimal choice, as, for example, a set of n-grams may have little value independently, but their collective removal could degrade the model significantly.

The exemplary pruning technique for n-gram language models is based on such existing techniques. It is still greedy in nature, as in each stage it proposes to prune the n-gram that least affects the performance of the model. However, in contrast to existing approaches, the independence assumption of the n-grams is relaxed, proposing an efficient algorithm that keeps the scores updated at all times.

In order to update all the scores, only the sequences that are affected when n-gram cw is removed are considered. In other words, only n-grams that affect the score of the cw are considered. For the probability score (Equation 2), $f_{prob}(cw)$ depends on $p(cw), p(w|c), \alpha'(c)$, and $p(w|\hat{c})$. $p(cw)$ refers to the probability in the original model, and is pre-calculated. $p(w|c)$ is stored explicitly with the sequence cw. The presence of cw implies that all its prefixes are present (Restriction 1), and $p(cw)$ can therefore be computed using Equation 2. Because of the restriction used for the backward tree data-structure, $p(w|\hat{c})$ is still stored when considering cw. Then, $f_{prob}(cw)$ can change during pruning only if $\alpha'(c)$ changes.

Since:

$$\alpha'(c) = \frac{1 - \sum_{v: (v,c) \in M} p(v|c) + p(w|c)}{1 - \sum_{v: (v,c) \in M} p(v|\hat{c}) + p(w|\hat{c})},$$

$\alpha'(c)$ changes only if $p(v|c)$ or $p(v|c')$ are pruned (where v is any symbol such that $cv \in M$ and $c'$ is any suffix of c). Because of the restriction however, $p(v|c')$ will never be pruned while $p(v|c)$ is still in the tree. Due to Restriction 2, the presence of cw implies that cw is not yet pruned, and therefore $p(w|c)$ is stored explicitly, together with that word. Therefore, in order to have accurate statistics for computing $f_{prob}(cw)$ only the values of $\alpha'(c)$ have to be updated. A look at Equation 2 shows that $a'(c)$ changes only if ca or $\hat{c}a$ is pruned (for any symbol a). Because of Restriction 2 however, $\hat{c}a$ will never be pruned while ca is still in the tree.

Summarizing, whenever a sequence cw is pruned, the only scores that may change are those of the sequences ca: $a \in \Sigma$. Thus, the updating may include updating the scores of these sequences that can change.

For entropy pruning, a similar reasoning leads to exactly the same set of n-grams to be updated. The score difference is computed between the prior model (the one before pruning this single n-gram) and the pruned one.

Pruning Algorithm

An example pruning algorithm in pseudo-code form is shown in Algorithm 1.

---
Algorithm 1: n-gram pruning with update
---

Data:
T: Language model, in trie form
f: n-gram scoring function
targetSize: Desired number of n-grams
/* needed for scores                                         */
T.calculateSequenceProbabilities( );
/* needed for efficient back-off recalculation               */
T.calculateBack-offNumerators( );
pq ← PriorityQueue( );
for node ∈ T do
    if prunable(node) then
        pq.push(f(node), node)
    end
end
while |T| > targetSize ∧ |pq| > 0 do
    nodeToErase ← pq.pop( );
    T. erase( nodeToErase);
        recalculateBack-off(nodeToErase.prevNode);
    for node ∈ nodeToErase.prevNode.nextNodes do
        if prunable(node) then
            if node ∈ pq then
                Mark entry of node in pq as invalid;
            end
            pq.push(f(node), node)
        end
    end
    for node ∈ {nodeToErase.ancestor, nodeToErase.prevNode} do
        if prunable(node) then
            /*node has just become prunable              */
            pq.push (f(node), node)
        end
    end
end

---

In one embodiment, a node is referred to as "prunable" when it satisfies Restrictions 1 (and 2), is not the root of the tree, and does not correspond to a unigram. A priority queue (heap) 94 can be used to store every prunable node (prunable at the moment), with nodes with lower $f$ value having greater priority. For each node in the trie, a pointer is stored to its entry in the priority queue, or a null pointer if it is not currently present. This allows the algorithm to determine if a node is present in the priority queue, and to set a flag to mark this entry as invalid (e.g., as a way to "erase" it) when its score is no longer valid.

If a considered node corresponds to sequence s, then node.ancestor corresponds to $s_2 \ldots s_{|s|}$ (the direct ancestor in the tree structure), node.prevNode corresponds to $s_1 \ldots s_{|s|-1}$; node.nextNodes is the set of nodes corresponding to sw: $w \in \Sigma$.

The priority queue stores the set of "prunable" nodes (those satisfying the order restriction, excluding unigrams and the root of the tree). The algorithm then works as follows:

1. Pre-processing: Calculate p(cw) for each n-gram cw, and back-off factors numerators.
2. Push every leaf of the tree into a priority queue, ordered by scoring function.
3. Pop the top leaf of the priority queue. Let cw be the corresponding n-gram.
4. Erase it from the tree (recalculate $\alpha(c)$).
5. Update the score of n-grams cv present in the priority queue.
6. Push ĉw into the queue if cw was its last child.
7. Repeat from 3 until desired size is reached.

The worst-case running time is $O(|M| \log |M| + |P| |\Sigma| \log |M|)$ (where P is the set of pruned n-grams). This is efficient for models with a small vocabulary (such as character-level models). In practice it runs faster since generally only a small subset of $\Sigma$ can follow a given sequence.

Probability Scoring

Once the pruning has been performed and a set of n-grams and their probabilities has been generated, these can be used, for example, as a language model to perform a prediction for a new input sequence 80. The probabilities for a sequence s of m symbols (such as a phrase or sentence) can be used to predict a score corresponding to the likelihood of observing the entire sequence as a function of the computed probabilities for each of the symbols in the sequence, given the respective context. This can be the product of the probabilities for each symbol in the sequence:

$$p(s = s_1 \ldots s_m) = \prod_{i=1}^{m} p(s_i \mid s_{i-k}, \ldots, s_{i-1},)$$

where k is the size of the context considered (e.g., 4 for n-grams of n=5). The score p(s) can be used as a ranking function to rank a set of candidate sequences, e.g., a set of candidate translations. The sequence with the highest rank (or a set of X sequences, where X is at least two), and/or a set of sequences meeting a threshold probability, can then be output.

In another embodiment, the output component 64 may output a score or determination that the sequence belongs to a given language, e.g., if a threshold p(s) is met (other conditions may also be considered). Alternatively, an average or other aggregate of the probability of each symbol may be used in predicting the language.

In another embodiment, given a sequence of symbols, the output component 64 may output the next symbol from the set of possible symbols in the vocabulary. This can be useful in transcription, where a speech to text converter is unable to recognize one or more words with a threshold confidence, or in transcribing biological sequences from fragmented sequences.

Without intending to limit the scope of the exemplary embodiment, the following examples illustrate application of the method.

EXAMPLES

Example 1

The performances of the pruned models are compared if the pruning scores are updated with respect to the static version. The evaluation was performed across both pruning scores for character-based language modeling on the Penn Treebank corpus (normalized and test/train split as in Mikolov, et al., "Subword language modeling with neural networks," preprint (available at fit.vutbr.cz/imikolov/rnnlm/char, 2012).

Figure 4:
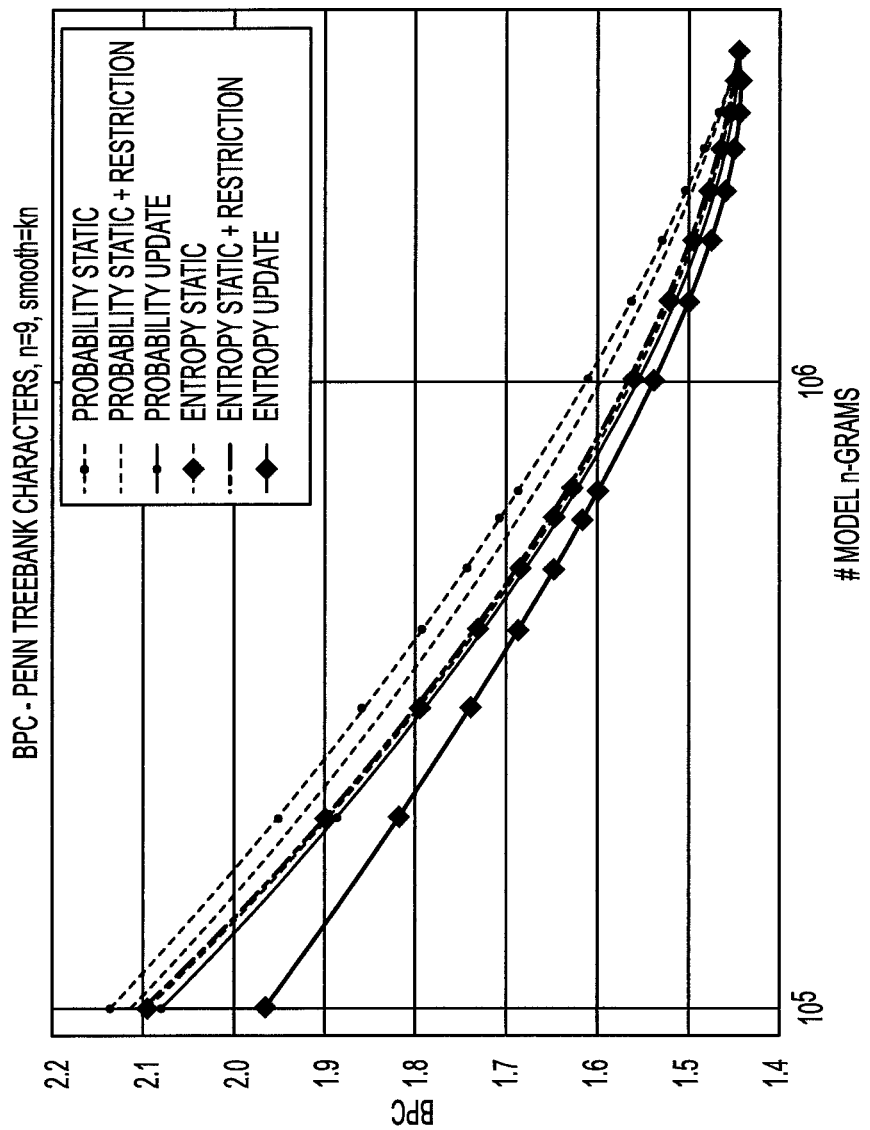
FIG. 4 is a plot showing bits-per-character (BPC) vs number of n-grams in the model (n=9) for a set of different models using Kneser-Ney smoothing.
Figure 5:
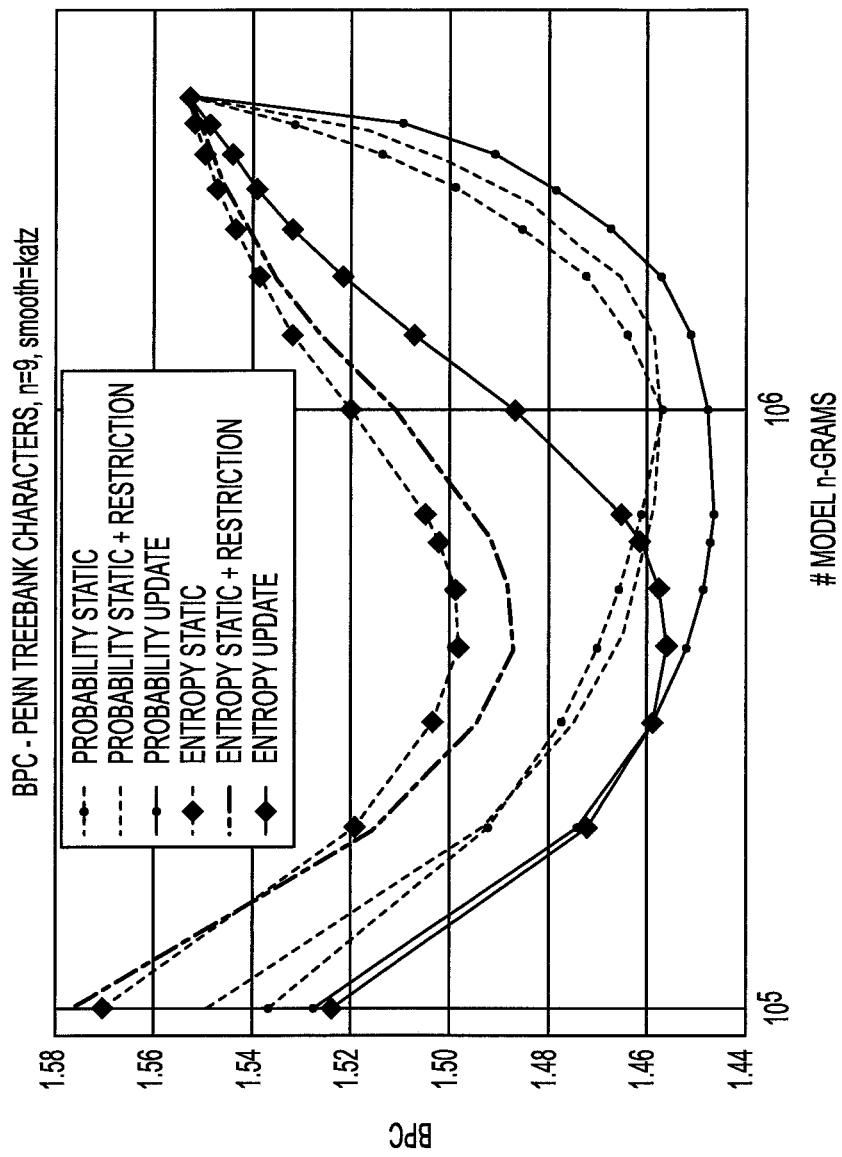
FIG. 5 is a plot showing BPC vs number of n-grams in the model (n=9) for a set of different models using Katz smoothing.
Figure 6:
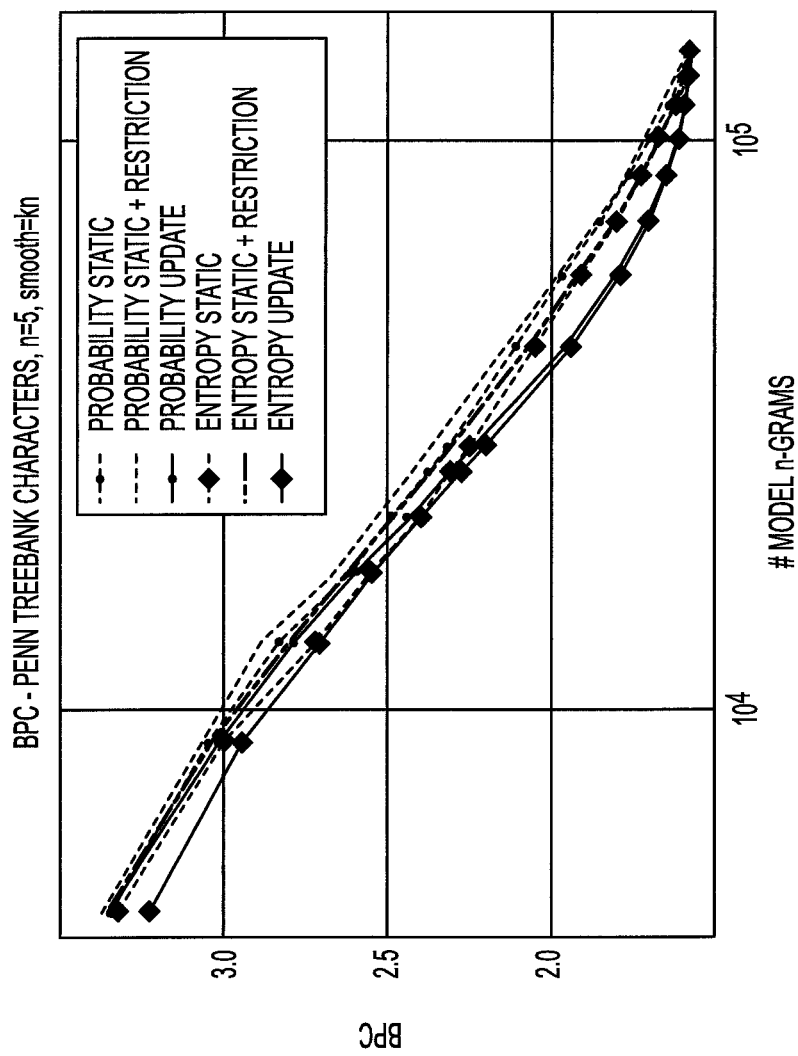
FIG. 6 is a plot showing BPC vs number of n-grams in the model (n=5) for a set of different models using Kneser-Ney smoothing.
Figure 7:
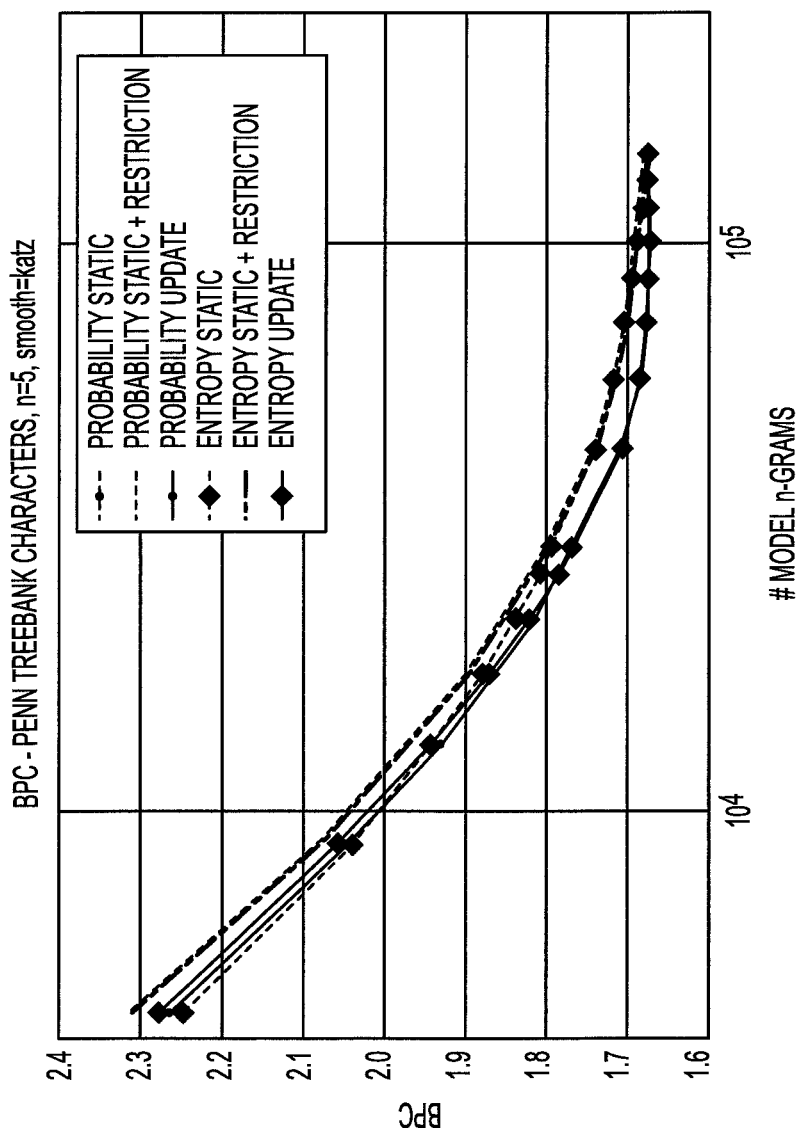
FIG. 7 is a plot showing BPC vs number of n-grams in the model (n=5) for a set of different models using Katz smoothing.
Figure 8:
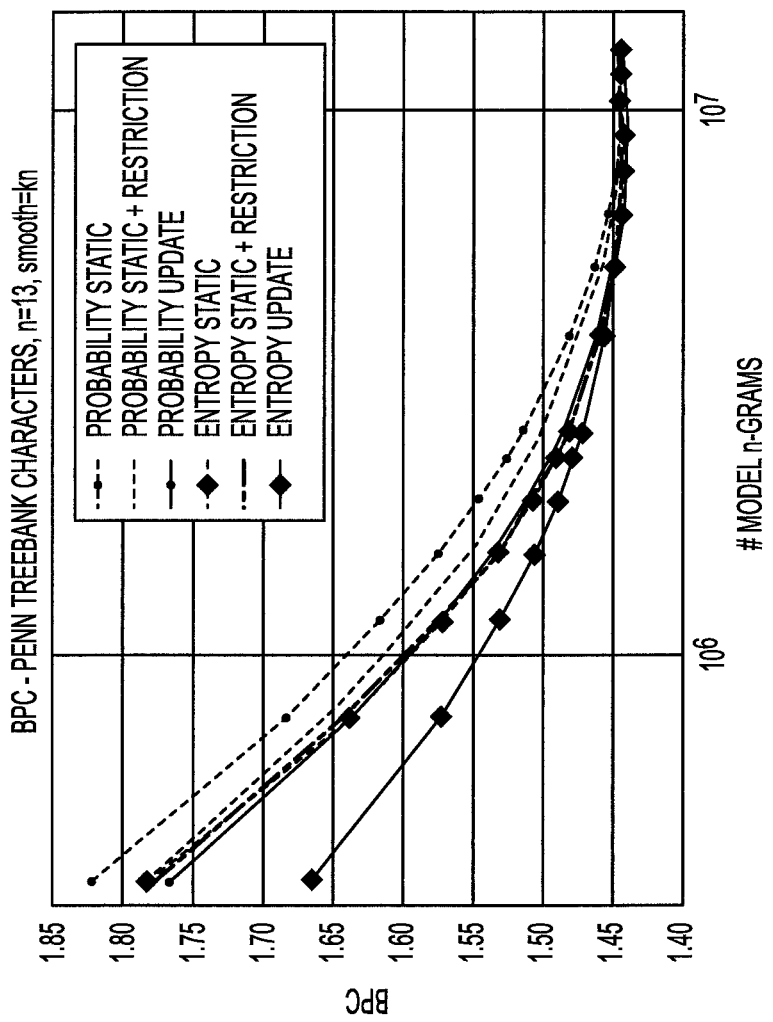
FIG. 8 is a plot showing BPC vs number of n-grams in the model (n=13) for a set of different models using Kneser-Ney smoothing.
Figure 9:
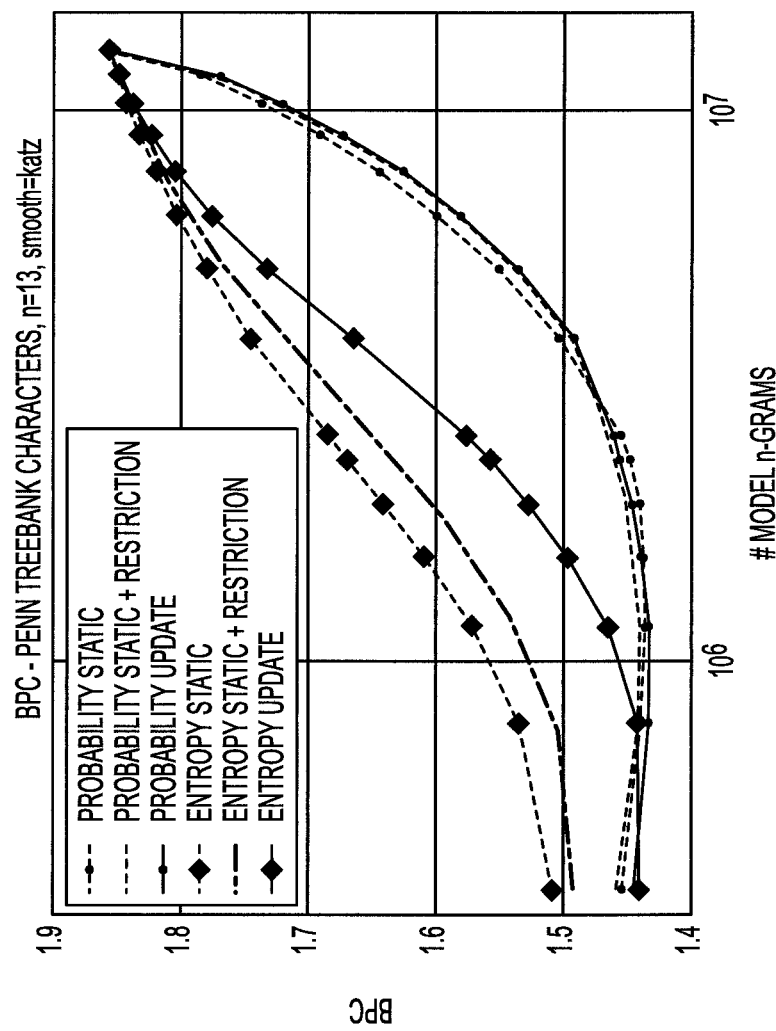
FIG. 9 is a plot showing number of symbols vs number of n-grams in the model (n=13) for a set of different models using Katz smoothing.

Experiments were performed for various order of n-grams (5-grams, 9-grams, 13-grams), two different smoothing techniques (Katz and Kneser-Ney) and different values of K (number of n-grams to keep). Bits-per-character (BPC, the binary logarithm of the perplexity) is shown as function of the number of n-grams in the resulting models in FIG. 4 (n=9 and Kneser-Ney smoothing); FIG. 5 (n=9 and Katz smoothing); FIG. 6 (n=5 and Kneser-Ney smoothing); FIG. 7 (n=5 and Katz smoothing); FIG. 8 (n=13 and Kneser-Ney smoothing); and FIG. 9 (n=13 and Katz smoothing). This is a representative example (neither the best nor worst), and similar results hold for other values of n and corpora. In the graphs:

Probability Static: uses the Probability pruning scoring function with no update.

Probability Static+Restriction: uses the Probability pruning scoring function, applying Restriction 2.

Probability Static+Update: uses the Probability pruning scoring function, applying Restriction 2, and updating the scoring function values.

Entropy Static uses the Entropy pruning scoring function with no update. Entropy Static+Restriction: uses the Entropy pruning scoring function, applying Restriction 2.

Entropy Static+Update: uses the Entropy pruning scoring function, applying Restriction 2, and updating the scoring function values.

In general, the present update method improves over the baseline regardless of n, the smoothing technique, pruning strategy or corpus. In relative terms, the improvement for the same size is around 5% and up to 12%. If, for example, it is desired to set the performance of the model at 1.5 bpc for Kneser-Ney smoothing, the update version of Entropy pruning allows a reduction in the language model's size by 23% (37% for Katz smoothing). Imposing the restriction on top of a static pruning already helps, but most of the gain comes from updating the scores.

The time taken to run both pruning techniques is generally reduced. The reason for the better performance for small amounts of pruning is that the original algorithm computes every score beforehand, while the update algorithm only maintains the score of prunable n-grams.

Example 2

Pruning techniques were evaluated using both pruning scores for character-based language modeling on the Brown corpus, and a subset (~25 MB) of a Wikipedia dump in Spanish (Dump from 2016-Feb. 3). The text was extracted with the WikiExtractor.py script, available at medialab.di-.unipi.it/wiki_Wikipedia_Extractor. Tags indicating the beginning and end of each document were removed. Section AA: Files 0-24 were used for training and files 28-32 were used for the test.

Figure 10A:
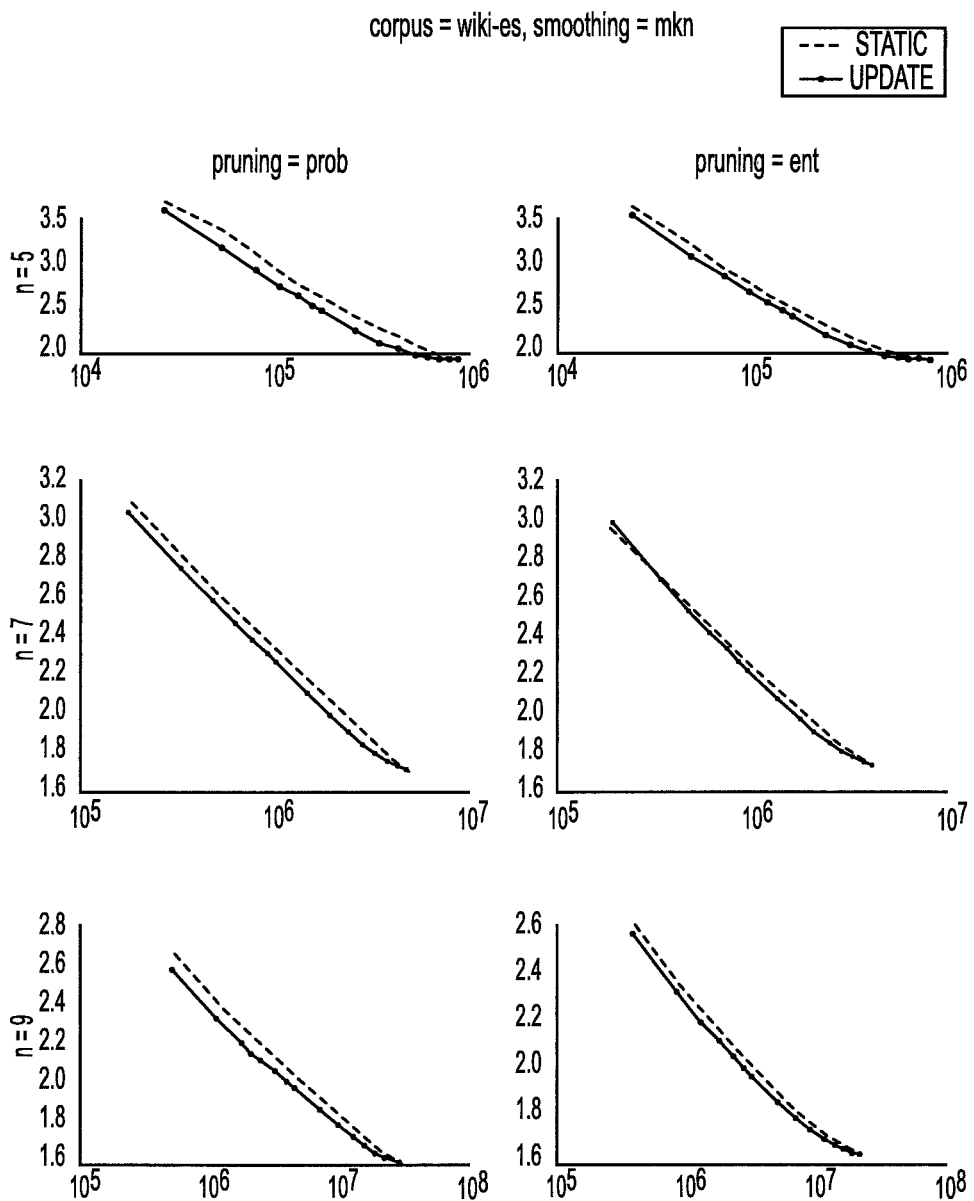
FIG. 10, which is split into FIGS. 10A and 10B, provides plots showing results for the wiki-es corpus and modified Kneser-Ney smoothing.
Figure 10B:
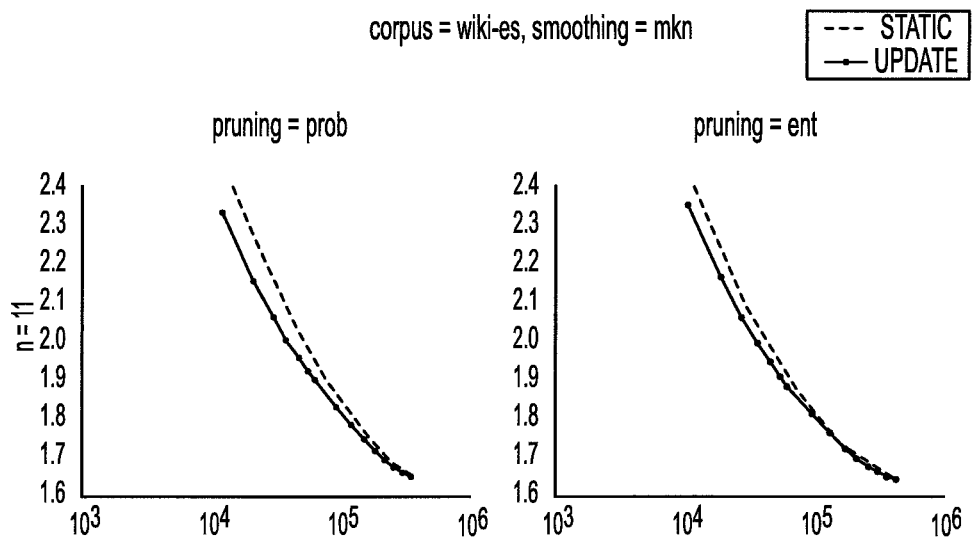
Figure 11A:
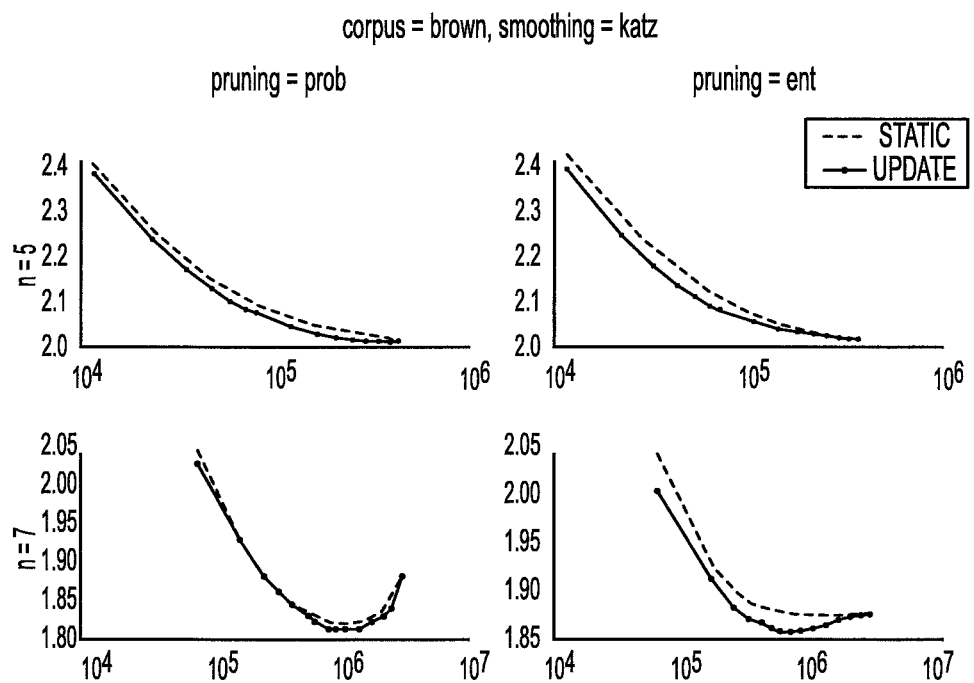
FIG. 11, which is split into FIGS. 11A and 11B, provides plots showing results for the Brown corpus with Katz smoothing.
Figure 11B:
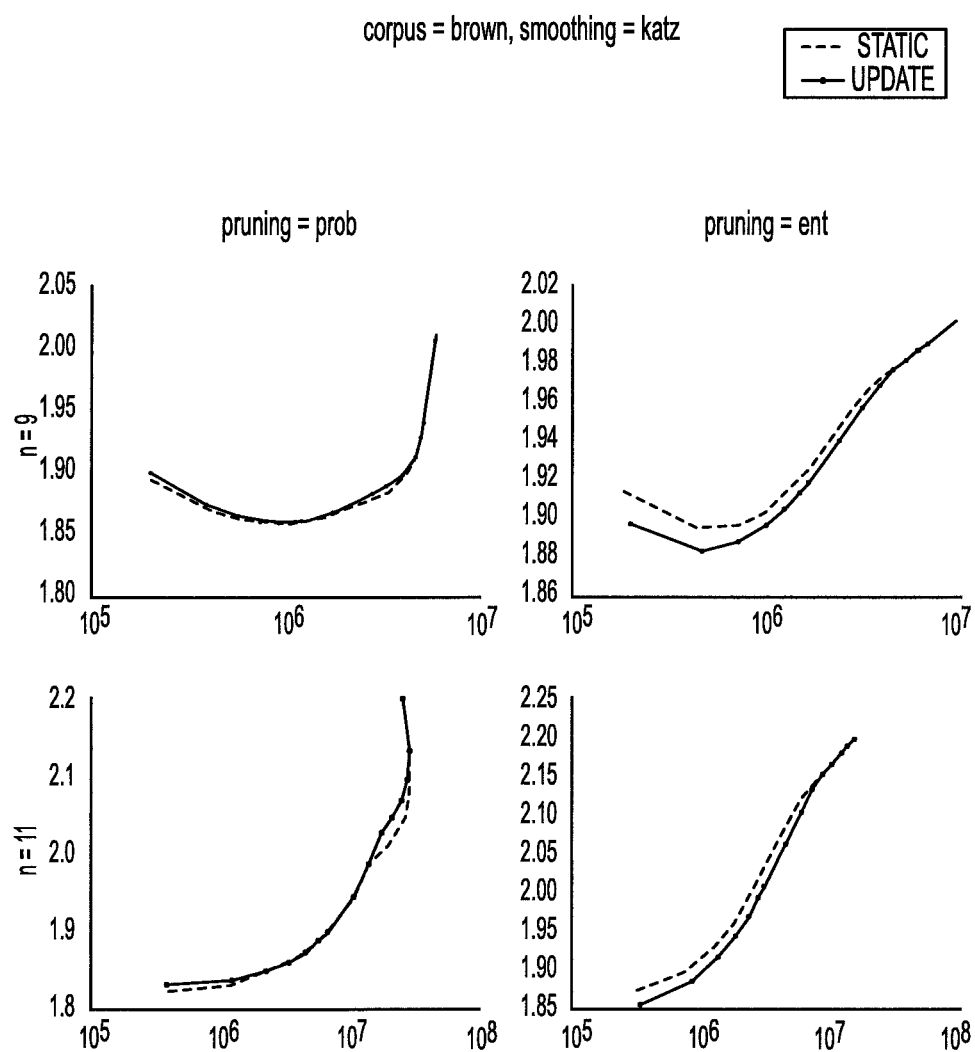

Experiments were run for various order of n-grams and two different smoothing techniques (Katz and modified Kneser-Ney), and two sets of experiments are reported in FIGS. 10(A and B) and FIGS. 11(A and B). The results for the pruning strategy of Seymore are not reported as it performed worse in general. For the baseline, only the partial order given by Restriction 1 was imposed, while for the update versions both restrictions were used. In all subfigures, the x-axis denotes the number of n-grams and the y-axis, bit-per-characters (binary logarithm of the cross-entropy). In general, the update method improves over the baseline regardless of n, the smoothing technique, pruning strategy or corpus. In general, the improvement is larger for bigger corpora and for modified Kneser-Ney smoothing. In relative terms, the improvement is around 5% and up to 12%, with respect to the baseline.

The pruning strategy is more costly in computational time than the baselines. While this only happens at modeling time (where time is arguably less an issue), this was evaluated to measure its impact. The results are reported in FIG. 12. For small amount of n-grams pruned, the update algorithm runs faster than the original one. The reason behind that is that the original algorithm has to calculate every score beforehand, while the update algorithm only maintains the score of prunable n-grams (those satisfying Restrictions 1 and 2). However, for greater pruning amounts, the algorithm with update runs a little slower, since it has to calculate the score of most n-grams anyway, possibly multiple times.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A sequence pruning method, comprising:
    representing a set of sequences in a data structure, each sequence in the set of sequences including a first symbol and a context of at least one symbol, a subset of the sequences in the set of sequences each being associated with a respective conditional probability that is based on observations of the respective sequence in training data;
    computing a value of a scoring function for each sequence in the set of represented sequences, the scoring function taking into account the conditional probability for the sequence and a probability distribution of each symbol in the sequence if the respective sequence is removed from the set of sequences, the conditional probability for each sequence in the set of sequences that is not in the subset of sequences being computed as a function of the probability of the respective symbol in a back-off context;
    iteratively pruning the set of sequences, comprising:
        selecting one of the represented sequences to be removed, the selection being based on the computed scoring function values; and
        updating the scoring function values of at least one of the remaining ones of the sequences;
    outputting a set of remaining sequences; and
    wherein at least one of the representing, computing, pruning, and updating is performed with a processor.

2. The method of claim 1, comprising continuing the iterative pruning until at least one of:
    a predetermined number of sequences remains, and
    a performance of the remaining sequences on a task reaches a threshold.

3. The method of claim 1, further including normalizing the conditional probability for sequences that are not in the subset of sequences with a back-off factor.

4. The method of claim 1, wherein the data structure is a tree and each sequence is represented by a respective node of the tree.

5. The method of claim 1, wherein at least one restriction is applied which is selected from:
    a restriction which prevents a given sequence from being removed unless all other sequences have been pruned which start with the given sequence where the given sequence is followed by at least one additional symbol; and
    a restriction which prevents a given sequence from being removed unless all other sequences have been pruned which end in the given sequence where the given sequence is preceded by at least one additional symbol.

6. The method of claim 1, wherein the selecting of one of the represented sequences to be removed includes generating a priority queue which stores a set of prunable sequences in order of scoring function value and selecting a represented sequence with a highest scoring function value.

7. The method of claim 1, wherein the symbols are selected from words, characters, and symbols representing units of a biological sequence.

8. The method of claim 7, wherein the sequences are extracted from a corpus of sentences.

9. The method of claim 1, wherein the context of each symbol comprises a set of at least one preceding symbol relative to the first symbol.

10. The method of claim 1, wherein the scoring function comprises computing a function of a conditional probability of each symbol in the sequence in a respective context.

11. The method of claim 1, wherein the output information comprises at least one of:
    a language model comprising at least some of the remaining sequences;
    a statistic for the sequence of being in a given language;
    a statistic of at least one symbol missing from the input sequence.

12. The method of claim 1, wherein the computing of the value of the scoring function for each the set of represented sequences comprises reserving a part of a probability for a symbol in a first context having a stored statistic for computing a probability for the symbol in a context not having a stored statistic.

13. The method of claim 12, wherein the reserving includes applying a smoothing technique which provides non-zero probabilities for symbols in contexts not having a stored statistic.

14. The method of claim 13, wherein the smoothing technique is selected from Katz smoothing, and Kneser-Ney smoothing.

15. The method of claim 1, wherein the updating the scoring function values of the at least one of the remaining sequences comprises only updating the scoring function values of represented sequences ca when a sequence cw is pruned, for all symbols a, where w is a symbol and c is a context.

16. The method of claim 1, wherein the scoring function computes a difference between log p(w|c)−log p'(w|c) for a sequence to be removed, where p(w|c) is a conditional probability for the sequence to be removed and p'(w|c) is a conditional probability of a sequence in a back-off context to the sequence to be removed.

17. A computer program product comprising a non-transitory recording medium storing instructions, which when executed on a computer, causes the computer to perform the method of claim 1.

18. A system comprising memory storing instructions for performing the method of claim 1 and a processor in communication with the memory which executes the instructions.

19. A sequence pruning system, comprising:
    a data structure representing a set of sequences, each sequence in the set of sequences including a first symbol and a context of at least one symbol, a subset of the sequences in the set of sequences each being associated with a respective conditional probability that is based on observations of the respective sequence in training data;
    a scoring function computation component which computes a value of a scoring function for each sequence in the set of represented sequences, the scoring function taking into account the conditional probability for the sequence and a probability distribution of each symbol in the sequence if the respective sequence is removed from the set of sequences, the conditional probability for each sequence in the set of sequences that is not in the subset of sequences being computed as a function of the probability of the respective symbol in a back-off context;

a sequence selecting component which selects a next one of the represented sequences to be removed, the selection being based on the computed scoring function values; and an update component which updates the scoring function values of remaining ones of the sequences prior to the sequence selecting component selecting another next one of the represented sequences to be removed;

an output component which outputs a set of remaining sequences; and a processor which implements the components.

20. The system of claim 19, further comprising a data structure generator which generates the data structure.

21. A sequence pruning method, comprising:

receiving a set of sequences, each received sequence in the set of sequences including at least one symbol and a context, wherein for at least some of the received sequences, the context comprises at least one respective preceding symbol, each of the received sequences in the set of sequences being associated with a respective conditional probability that is based on observations of the sequence in a corpus;

representing each of the received sequences as a respective node in a tree structure of nodes in which each of the nodes in the tree structure is directly linked to no more than one node in the tree structure that represents a direct ancestor and wherein at least some of the nodes in the tree structure represent back-off sequences in which the context of a linked node in the tree structure is reduced by at least one symbol;

computing a value of a scoring function for at least some of the sequences in the tree structure based on respective conditional probabilities, a conditional probability for sequences represented in the tree structure that are not in the set of received sequences being computed as a function of a respective symbol in its back-off context;

selecting one of the represented sequences to be removed, based on the computed scoring function values, the one of the represented sequences being selected from represented sequences for which there are no remaining sequences represented in the tree structure that consist of at least one symbol and the same sequence as the selected sequence, which precedes the at least one symbol;

updating a value of a scoring function for at least one remaining one of the sequences, whose scoring function value is changed by the removal of the selecting one of the represented sequences;

after the updating, repeating the selecting of one of the represented sequences from a remaining set of represented sequences;

outputting a set of the remaining sequences; and wherein at least one of the representing, computing, selecting, and updating is performed with a processor.

* * * * *